United States Patent Office 3,644,325
Patented Feb. 22, 1972

3,644,325
USE OF AMMONIA IN THE PREPARATION OF CATALYSTS FOR OLEFIN POLYMERS HAVING IMPROVED PROCESSABILITY
Reginald F. Roberts, Jr., Baton Rouge, La., assignor to The Dow Chemical Company, Midland, Mich.
No Drawing. Filed Dec. 11, 1969, Ser. No. 884,345
Int. Cl. C08f 1/56
U.S. Cl. 260—94.9 C                              5 Claims

ABSTRACT OF THE DISCLOSURE

Linear olefin polymers having improved processability are provided by low pressure polymerization of ethylene monomer in the presence of an aluminum alkyl and titanium trichloride which has been pretreated with a small amount of ammonia.

BACKGROUND OF THE INVENTION

This invention relates to polymerization methods for producing linear olefin polymers having improved processability, i.e., improved flow characteristics.

It is well known to polymerize olefins such as ethylene, propylene, and 1-butene in the presence of metallic catalysts, particularly the reaction products of organometallic compounds and transition metal compounds to form substantially unbranched polymers of relatively high molecular weight. Typically such polymerizations are carried out at relatively low temperatures and pressures. The resulting generally linear olefin polymers are generally characterized by greater stiffness and higher density than olefin polymers having highly branched polymer chains.

Among the methods for producing linear olefin polymers, some of the most widely utilized are those described by Professor Karl Ziegler in U.S. Pats. 3,113,115 and 3,257,332. In these methods the catalyst employed are obtained by admixing a compound of a transition metal of Groups 4b, 5b, 6b and 8 of the Periodic Table of Elements, Handbook of Chemistry and Physics, 48th ed., Chemical Rubber Company, with an organometallic compound. Generally the halides and oxyhalides of titanium, vanadium and zirconium are the most widely used transition metal compounds. Outstanding examples of the organometallic compound include the hydrides, alkyls and haloalkyls of aluminum, alkyl aluminum halides, Grignard reagents, alkali metal aluminum hydrides, alkali metal borohydrides, alkali metal hydrides, alkaline earth metal hydrides and the like. Polymerization in accordance with Ziegler processes is readily effected by feeding a stream of olefin into an inert organic medium, e.g., benzene or liquid aliphatic hydrocarbon, containing one of the above described catalysts.

Linear olefin polymers formed by the above processes frequently have such high molecular weights that they often have relatively poor melt flow properties. The melt flow properties of olefin polymers, particularly polyethylene and copolymers of ethylene with other α-olefins, are very important in such commercial applications as bottle blowing, cast film, blown film and injection molding. One measurement which closely correlates with melt flow properties of the polymer is the $I_{10}/I_2$ ratio. $I_{10}$ is the melt index of the polymer determined at 190° C. with a 10-kilogram weight in accordance with ASTM D–1238–65T, and $I_2$ is the melt index of the polymer determined also at 190° C. by this test but a weight of 2.16 kilograms is used. For polymers having a given $I_2$ value, those having higher $I_{10}/I_2$ ratios will flow more readily and an article fabricated from the polymer having the higher $I_{10}/I_2$ ratio will have a smoother surface. In addition, olefin polymers having increased $I_{10}/I_2$ ratios are considered to have a higher degree of shear sensitivity. High shear sensitivity is important to the plastics fabricator in that higher extrusion rates may be obtained for a given shear stress thereby improving the workability of the polymer, i.e., less work need be done on the polymer to obtain a given degree of output of the fabricated article.

The $I_{10}/I_2$ ratio is believed to be dependent on the molecular weight distribution of the polymer with broader molecular weight distributions corresponding to higher $I_{10}/I_2$ ratios. One practice in the art to increase the $I_{10}/I_2$ ratio of ethylene polymers is to mechanically blend olefin polymer fractions of widely separate average molecular weights and relatively narrow molecular weight distributions. Such blending procedures necessarily increase the cost of the linear olefin polymer and discourage the use of the polymer in applications wherein the polymer would otherwise be acceptable and desirable.

In view of the above-described deficiencies of the prior art methods, it would be highly desirable to provide a polymerization method for producing linear olefin polymers having broad molecular weight distributions.

SUMMARY OF THE INVENTION

In accordance with the present invention linear ethylene polymers having broad molecular weight distributions are prepared by a method which comprises polymerizing ethylene in a closed reactor under an inert atmosphere in the presence of an active Ziegler polymerization catalyst prepared by the interaction of an organometallic reducing compound with the reaction product of titanium trichloride and from about 0.01 to about 3 moles of ammonia per mole of titanium trichloride.

Linear ethylene polymers prepared in accordance with the methods which employ this novel catalyst exhibit improved melt flow characteristics thereby enabling them to be fabricated into articles having smooth surfaces and excellent tensile modulus and stress crack properties. Examples of articles which may be fabricated from these polymers include bottles, films and protective coverings, injection and compression molded articles, cable jacketing and the like.

DESCRIPTION OF THE PREFERRED EMBODIMENTS

This invention is broadly applicable to linear polymers of α-olefins having from 2 to 7 carbon atoms which can be produced by Ziegler-type polymerization processes. Advantageously, this invention is applicable to linear ethylene polymers which include homopolymers of ethylene and copolymers of ethylene with α-olefins having from 3 to 7 carbon atoms such as propylene, 1-butene, 1-pentene, 1-hexene, 3-methyl-1-pentene, 1-heptene and the like.

By "linear olefin polymer" is meant that the backbone chain of the polymer macromolecule is substantially non-crosslinked and non-branched, i.e., linear, and includes polymers having linear main chains with substituent groups attached thereto arising from substituted ethylene monomer.

Novel catalysts employed in the practice of this invention comprise the product of interaction of an organometallic reducing compound with the reaction product of titanium trichloride with from about 0.01 to about 3 moles of ammonia per mole of titanium trichloride, preferably from about 0.1 to about 1 mole. The molar ratio of organo metallic compound to titanium of the titanium trichloride reaction product ranges from about 0.1:1 to about 10:1, preferably from about 0.1:1 to about 1:1.

Suitable organometallic reducing compounds are the aluminum alkyls having the formula $R_nAlX_y$ wherein R is alkyl having from 1 to 6 carbon atoms, X is hydrogen or halogen, n is 1, 2 or 3 and y is $3-n$. Examples of suitable aluminum alkyls include triethyl- and triisobutylaluminum, diethylaluminum chloride, isobutylaluminum dichloride, dipropylaluminum bromide and the like. Preferred aluminum compounds are aluminum trialkyls such as triethylaluminum and triisobutylaluminum. Other aluminum compounds which are suitable include diisobutylaluminum hydride, dipropylcyclohexylaluminum, diisobutylaluminum iodide, and the like. It is understood that mixtures of the foregoing types of aluminum compounds can be employed. Aluminum compounds which also can be used are the total reaction mixtures obtained in the formation of the above aluminum compounds, e.g., by treatment of metallic aluminum with alkyl halides resulting in the formation of such mixtures as $R_2AlCl$ plus $RAlCl_2$, termed organoaluminum sequihalides.

Titanium trichloride suitable for the purposes of this invention can be of the $\alpha$, $\beta$, $\gamma$ and $\delta$ crystalline modifications. $\beta$-Titanium trichloride, which is preferred, is advantageously prepared by conventional techniques of interacting an aluminum compound such as triethyl aluminum with titanium tetrachloride in hexane solution under an inert atmosphere such as nitrogen. The brown $\beta$-titanium trichloride precipitate which is formed is then contacted under inert atmosphere with an anhydrous ammonia. Beneficially the amount of ammonia employed ranges from about 0.01 to about 3 moles per mole of titanium trichloride, preferably from about 0.1 to about 1 mole. It is desirable to carry out pretreatment of titanium trichloride with ammonia in an inert organic medium at temperatures ranging from about $-20°$ to about $100°$ C., preferably about $20°$ to about $40°$ C., and pressures from atmospheric to superatmospheric, preferably from about 1 to about 10 atmospheres. Suitable inert organic media include the aliphatic hydrocarbons such as n-hexane and n-heptane, and aromatic hydrocarbons such as benzene and toluene.

Ammonia employed in this method contains essentially no water, carbon dioxide, oxygen or other well known catalyst poisons.

The method of the present invention is a modified Ziegler polymerization which is carried out by feeding a stream of ethylene or mixture of ethylene and other $\alpha$-olefins into a reaction vessel containing catalytic amounts of the above described catalyst dispersed in an inert diluent. Preferably the catalyst is present in concentrations ranging from about 0.1 to about 10 millimoles of titanium per liter of diluent. Advantageously polymerization is effected in the substantial absence of oxygen, moisture and carbon monoxide at temperatures ranging from about $0°$ to about $100°$ C., preferably from 20 to $90°$ C., and pressures from atmospheric to superatmospheric, preferably from 1 to 10 atmospheres.

Suitable inert diluents are the saturated aliphatic and cyclic and aromatic hydrocarbons. Of these, the aliphatic hydrocarbons such as n-pentane, n-hexane, iso-pentane, n-heptane and n-octane; the aromatic hydrocarbons such as benzene and toluene; and the like are preferred. The quantity of inert diluent used is subject to substatial variation. The amount of diluent in the polymerization recipe may be kept as low as from about 0.1 to about 0.5 part by weight of diluent per part by weight of total polymer product. However, it is often helpful in obtaining sufficient contact between monomer and catalyst and in facilitating the removal of heat of reaction to employ larger amounts of the inert diluent, e.g., from about 4 to about 30 parts of diluent per part of polymer product.

The polymerization can be carried out in a batchwise manner or in a continuous manner wherein starting materials are fed continuously or intermittently into the reactor and polymer product is withdrawn continuously or at intervals from the reactor.

As an optional modification, the starting polymerization recipe may contain a molecular weight control agent such as hydrogen. Said agents generally lower the weight average molecular weight of the resulting polymer. As further modification, the molecular weight control agent can be employed during only a portion of the total polymerization, thereby broadening molecular weight distribution to an even further degree. When hydrogen is employed, it is beneficially introduced into the reactor as part of the monomer feed stream in amounts ranging from about 0.01 to about 9 moles per mole of monomer, preferably from about 0.1 to about 2 moles.

Isolation of polymer is done by conventional techniques. For example, the reaction mixture may be quenched with alcohol to deactivate catalyst. Subsequently the polymer product is washed with alcohol or mineral acid for further removal of catalyst residues.

The polymers prepared in accordance with this invention are characterized as linear olefin polymers having broad molecular weight distributions and excellent melt flow characteristics when compared to linear olefin polymers prepared by conventional Ziegler polymerization.

The following examples are given for the purposes of illustrating the present invention and should not be construed as limiting its scope. In the following examples, all parts and percentages are by weight unless otherwise indicated and all $I_2$ values of melt indexes and melt flow viscosities are determined according to ASTM D-1238-65T(E) and $I_{10}$ values are determined according to ASTM D-1238-65T(N).

Example 1

A solution of 500 millimoles of triisobutylaluminum in 1 liter of dry n-hexane is added to a stirred solution of 500 millimoles of titanium tetrachloride in 1 liter of dry n-hexane. $\beta$-titanium trichloride precipitates from the reaction mixture and is washed with n-hexane by decantation and collected in a nitrogen-purged one-liter catalyst bottle. Anhydrous ammonia is fed continuously into the catalyst bottle at a rate of $\sim$100 ml./min. until a molar ratio of 0.60 $NH_3/\beta$-$TiCl_3$ is attained. The temperature of the bottle is maintained at approximately room temperature. A solution of approximately 500 millimolar triisobutyl aluminum is added with stirring to approximately 1 liter of hexane in a 2½ liter glass reactor purged with nitrogen. Immediately thereafter, sufficient partially ammoniated $\beta$-titanium trichloride from the catalyst bottle is added to produce an Al/Ti ratio of $\sim$1:1. The catalyst mixture is diluted to 2 liters with hexane and the nitrogen atmosphere is displaced with hydrogen. The reactor temperature is raised to approximately $85°$ C. and a mixture of ethylene and hydrogen ($H_2/C_2H_4$ mole ratio=0.67) is fed into the reactor at $85°$ C. and 45 p.s.i.g. for 30 minutes. The polymerization reaction is essentially completed after 30 minutes and the polymer product is recovered and washed with hexane. The recovered polyethylene has a melt index ($I_2$) of 0.44 decigram per minute and an $I_{10}/I_2$ ratio of 14.5. A portion of the resulting polyethylene is fed into a combination extruder and bottle-blowing apparatus at a rate of 100 pounds/hour and is fabricated into bottles having smooth surfaces and satisfactory bottle weight.

For the purposes of comparison and to particularly point out the advantages of the present invention, a control sample polyethylene is prepared according to Example 1 with the exception that the $\beta$-titanium trichloride is not ammoniated. The control sample polyethylene has a melt index ($I_2$) of 0.83 decigram/minute and $I_{10}/I_2$ ratio of 12.4. The control sample is fabricated into bottles in accordance with the procedure described in Example 1. The resulting bottles have reduced bottle weights.

Example 2

A solution of 500 millimoles of titanium tetrachloride in 1 liter of dry n-hexane is added to a stirred solution of 500 millimoles of diethyl aluminum chloride in 1 liter of dry hexane. The resulting precipitated $\beta$-titanium trichloride is washed, collected and treated with an amount of anhydrous ammonia sufficient to provide a molar ratio of 0.40 $NH_3/\beta$-$TiCl_3$. The ammoniated $\beta$-titanium trichloride is activated with a hexane solution of triisobutyl aluminum according to procedure described in Example 1. A stream of ethylene containing hydrogen ($H_2/C_2H_4$ molar ratio=1.06) is polymerized by feeding the stream into a reactor containing the catalyst under polymerisation conditions substantially the same as in Example 1. The resultant polymer has an $I_{10}/I_2$ ratio of 20.6. A similar run is also carried out using β-titanium trichloride which has been pretreated with anhydrous ammonia in amount sufficient to provide a molar ratio of 0.10 $NH_3/\beta\text{-}TiCl_3$. This ammoniated β-$TiCl_3$ is activated with a hexane solution of triisobutyl aluminum according to procedure of Example 1. Ethylene is polymerized in the presence of this catalyst and hydrogen ($H_2/C_2H_4$ molar ratio=1.33). The polymerization product has an $I_{10}/I_2$ ratio of 15.2. Polymerization of ethylene under essentially the same conditions with the exception that the β-titanium trichloride is not pretreated with ammonia yields a polymer product having an $I_{10}/I_2$ ratio of 11.7.

Runs similar to Examples 1 and 2 wherein different molar ratios of $NH_3/\beta\text{-}TiCl_3$ and of $H_2/C_2H_4$ within the ranges specified hereinbefore are employed yield polymer product having noticeably increased $I_{10}/I_2$ ratios.

What is claimed is:

1. A catalyst composition useful in the preparation of linear ethylene polymers having broad molecular weight distributions, which comprises the interaction product of (a) an aluminum alkyl having the formula $R_nAlX_y$ wherein R is alkyl having from 1 to 6 carbon atoms, X is hydrogen or halogen, $n$ is 1, 2 or 3 and $y$ is $3-n$ with (b) the reaction product of titanium trichloride and from about 0.01 to about 3 moles of ammonia per mole of titanium trichloride, the molar ratio of aluminum to titanium of the interaction product ranging from about 0.1:1 to about 10:1.

2. The composition of claim 1 wherein the titanium trichloride is of the β-crystalline modification.

3. The composition of claim 1 wherein the aluminum alkyl is tri-isobutyl aluminum.

4. The composition of claim 1 wherein the titanium trichloride is of the β-crystalline modification and the aluminum alkyl is triisobutyl aluminum.

5. A low pressure polymerization process for preparing linear ethylene polymers having broad molecular weight distributions which comprises contacting ethylene with the catalyst according to claim 1.

References Cited
UNITED STATES PATENTS

| | | | |
|---|---|---|---|
| 3,027,360 | 3/1962 | Raum | 260—93.7 |
| 3,139,418 | 6/1964 | Marullo et al. | 260—93.7 |
| 3,318,860 | 5/1967 | Eichenbaum | 260—93.7 |

JOSEPH L. SCHOFER, Pimary Examiner

E. J. SMITH, Assistant Examiner

U.S. Cl. X.R.

252—429 B; 260—88.2, 94.9 B